United States Patent [19]

Babu

[11] Patent Number: 5,451,964
[45] Date of Patent: Sep. 19, 1995

[54] METHOD AND SYSTEM FOR RESOLVING DOUBLE DIFFERENCE GPS CARRIER PHASE INTEGER AMBIGUITY UTILIZING DECENTRALIZED KALMAN FILTERS

[75] Inventor: B. A. Kumar Babu, Lewisville, Tex.

[73] Assignee: Del Norte Technology, Inc., Euless, Tex.

[21] Appl. No.: 282,918

[22] Filed: Jul. 29, 1994

[51] Int. Cl.6 .......................... G01S 5/02; H04B 7/185
[52] U.S. Cl. ................... 342/357; 364/449; 342/352
[58] Field of Search ................... 342/357, 358, 352; 455/12.1; 364/445

[56] References Cited

U.S. PATENT DOCUMENTS

| | | | |
|---|---|---|---|
| 4,812,991 | 3/1989 | Hatch | 364/458 |
| 5,252,982 | 10/1993 | Frei | 342/357 |
| 5,359,332 | 10/1994 | Allison et al. | 342/357 |

*Primary Examiner*—Thomas H. Tarcza
*Assistant Examiner*—Dao L. Phan
*Attorney, Agent, or Firm*—Andrew J. Dillon

[57] ABSTRACT

A method and system for accurately determining the position coordinates of a mobile GPS receiver by resolving the double difference GPS carrier phase integer ambiguity. A reference station is provided at precisely known coordinates and carrier phase data and pseudoranges for each received GPS satellite are calculated at both the reference station and the mobile GPS receiver. A communications link couples carrier phase data, pseudorange data and the known reference station position from the reference station to the mobile GPS receiver. A first Kalman filter within the mobile GPS receiver operates on GPS satellite ephemeris parameters and the calculated pseudoranges to obtain an error state vector for position and time. The GPS satellite ephemeris parameters and calculated carrier phase data are then applied to a second Kalman filter to obtain a predicted vector of velocity and clock rate error. Line of sight range and range rates are then estimated utilizing the outputs of both Kalman filters and utilized, together with double difference phase measurements, to resolve the double difference carrier wave integer ambiguity providing an accurate set of coordinates for the mobile GPS receiver.

8 Claims, 7 Drawing Sheets

METHOD AND SYSTEM FOR RESOLVING DOUBLE DIFFERENCE GPS CARRIER PHASE INTEGER AMBIGUITY UTILIZING DECENTRALIZED KALMAN FILTERS

BACKGROUND OF THE INVENTION

1. Field of the Invention

The present invention relates in general to the use of satellite position signals to determine the position of a point on the surface of the earth and in particular to a system for accurately determining the position coordinates of a mobile GPS receiver utilizing a fixed reference station. Still more particularly, the present invention relates to a system for accurately determining the position of a mobile GPS receiver by resolving double difference GPS carrier phase integer ambiguity utilizing decentralized Kalman filters.

2. Description of the Prior Art

Since the early 1980's the Global Positioning System (GPS) satellite system has been utilized. This system will eventually comprise a large number of satellites in orbits approximately 11,000 miles above the earth's surface inclined about 55° from the equatorial plane. The satellites are not at a constant position but have a twelve hour orbit. At any point on the earth a ground based receiver can normally receive signals from at least four GPS satellites. A basic explanation of GPS and its use in surveying is given in Hurn, "GPS, A Guide to the Next Utility," Trimble Navigation, 1989, incorporated herein by reference thereto.

Each GPS satellite transmits signals which contain information that enables distance measurement to be made by measuring the transit time of a pseudo-random number (PRN) code from a satellite to a GPS receiver. The PRN code is a very faint signal which hardly registers above the earth's natural background noise; however, this signal can be received by an antenna only inches in size. Decoding of these signals is accomplished in known fashion by sampling the PRN code and correlating the code with a replica code generated by a GPS receiver thus permitting the PRN code to be picked out of the earth's background noise.

The PRN code typically includes an implicit time signal, as measured by an atomic clock on board the satellite, at which the signal left the satellite. Over time, these signals also include information about the satellite's current orbit in space as well as corrections for known errors in the satellite's clock.

Two types of services produce signals from the GPS satellites. First, the Precise Position Service (PPS) produces for the military the most accurate dynamic positioning possible utilizing the GPS system, based upon the dual frequency Precise or Protected code know as the P-code. Users must have an encryption code in order to access the P-code which is not generally available to the public. Standard Positioning Service (SPS) produces the publicly accessible civilian positioning accuracy obtained by utilizing the single frequency "Clear Acquisition" (C/A) code. The Department of Defense has the ability to degrade the accuracy of the C/A code utilizing "Selective Availability" (S/A) or by artificially creating clock and other errors to prevent hostile military forces from navigating accurately utilizing the C/A code.

Computation of positional coordinates utilizing GPS signal data may be simply accomplished by receiving the PRN code and recording the received time as measured by the receiver's clock. Relative clock offsets may be taken into account and the difference between a signal's departure time and arrival time is the total travel time. The distance from a GPS satellite to the receiver's position may then be approximated by multiplying the speed of light times the total travel time. In this manner, if time is known, a position may be determined utilizing a minimum of three satellite signals. The calculated position can be at only one of two points at which three spheres around the three GPS satellites intersect. For a position known to be on earth, one of these points will generally be not possible (somewhere in space) so three satellites are generally enough to pinpoint a location. If precise time is not known then information from a fourth satellite will be necessary.

Thus, those skilled in the art will appreciate that GPS satellite broadcast systems permit PRN code tracking and analysis which permits positional fixes of high accuracy, but low precision due to refraction, clock errors, noise, time errors and ephemeris errors. Alternately, carrier phase-detection techniques may be utilized; however, such techniques produce high precision but low accuracy positional fixes due to uncertainties of carrier-wave identification and phase lock.

Solutions to enhance the carrier-phase estimation techniques generally involve measurement of carrier phase shift and an analysis of all likely numbers of integer waveforms which may have generated the resultant signal. This technique is rather time consuming in that all possible solutions for the number of integer waveforms must be analyzed and the most likely solution must then be determined.

Multiple techniques have been proposed for increasing the accuracy of the GPS position system and examples of these systems are set forth within U.S. Pat. Nos. 5,311,194, issued to Brown; 5,155,490, issued to Spradley, Jr., et al.; and 5,252,982, issued to Frei.

Upon reference to the foregoing those skilled in the art will appreciate that a method and system whereby the integer ambiguity of GPS carrier phase may be resolved in real time, such that a highly accurate position coordinates for a mobile GPS receiver may be determined, would be highly desirable.

SUMMARY OF THE INVENTION

It is therefore one object of the present invention to provide a method and system for utilizing satellite position signals to determine the position of a point on the surface of the earth.

It is another object of the present invention to provide a method and system whereby the position coordinates of a mobile GPS receiver may be accurately determined utilizing a fixed reference station.

It is yet another object of the present invention to provide an improved method and system whereby the position coordinates of a mobile GPS receiver may be in real time accurately determined by resolving double difference GPS carrier phase integer ambiguity utilizing decentralized Kalman filters.

The foregoing objects are achieved as is now described. The method and system of the present invention may be utilized to accurately determine the position coordinates of a mobile GPS receiver by resolving the double difference GPS carrier phase integer ambiguity. A reference station is located at precisely known coordinates and carrier phase data and pseudoranges for each received GPS satellite are calculated at both the reference station and the mobile GPS receiver. A communications link couples carrier phase data, pseudorange data and the known reference station position from the reference station to the mobile GPS receiver. A first Kalman filter within the mobile GPS receiver operates on GPS satellite ephemeris parameters and the calculated pseudoranges from the reference station and the mobile GPS receiver to obtain an error state vector for position and time. The GPS satellite ephemeris parameters and calculated carrier phase data from the reference station and the mobile GPS receiver are then applied to a second Kalman filter to obtain a predicted vector of velocity and clock rate error. Line of sight range and range rates are then estimated utilizing the outputs of both Kalman filters and utilized, together with double difference phase measurements, to resolve the carrier wave integer ambiguity which provides the basis for computing an accurate set of coordinates for the mobile GPS receiver.

Additional objectives, features and advantages will be apparent in the written description which follows.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
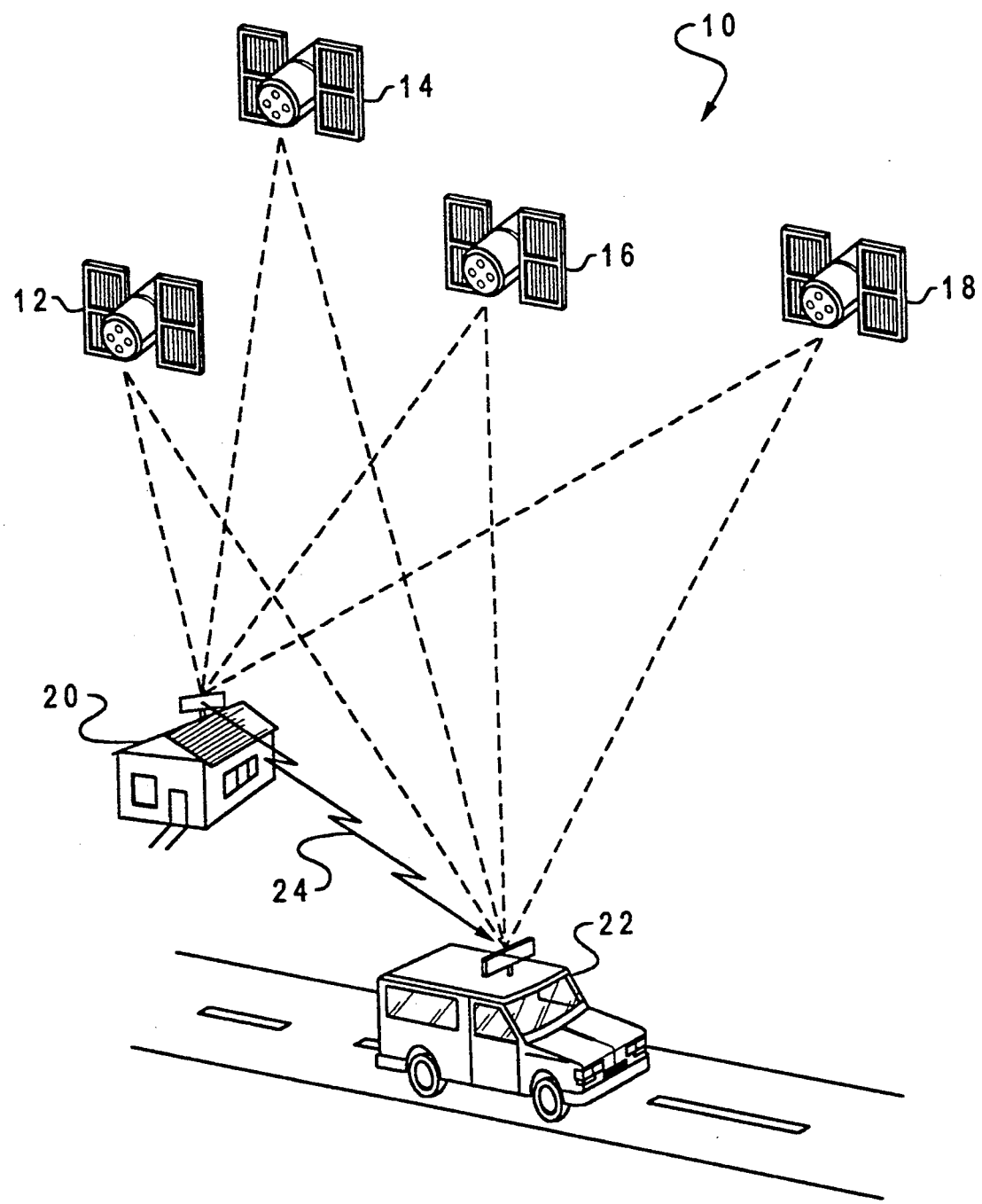
FIG. 1 is a pictorial representation of a multiple satellite GPS system which may be utilized to implement the method and system of the present invention.

With reference now to the figures, and in particular with reference to FIG. 1, there is depicted a pictorial representation of a multiple satellite GPS system 10 which may be utilized to implement the method and system of the present invention. As illustrated, multiple satellite GPS system 10 preferably includes a large number of GPS satellites which are in orbits approximately 11,000 miles above the earth's surface inclined about 55° from the equatorial plane. For purposes of illustration for GPS satellites 12, 14, 16 and 18 are depicted.

As illustrated within FIG. 1, a reference GPS receiver station 20 is depicted. Reference GPS receiver station 20 is preferably located at precisely known coordinates with respect to the surface of the earth and includes a GPS receiver and its associated circuitry as well as a radio modem which may be utilized to communicate data to a mobile GPS receiver station 22. As depicted, selected data may be coupled between reference GPS receiver station 20 and mobile GPS receiver station 22 over radio frequency link 24. Additionally, mobile GPS receiver station 22 preferably includes a GPS receiver station and its associated circuitry and in the manner depicted within FIG. 1, both reference GPS receiver station 20 and mobile GPS receiver station 22 may be utilized to detect satellite data from a large number of GPS satellites.

Figure 2:
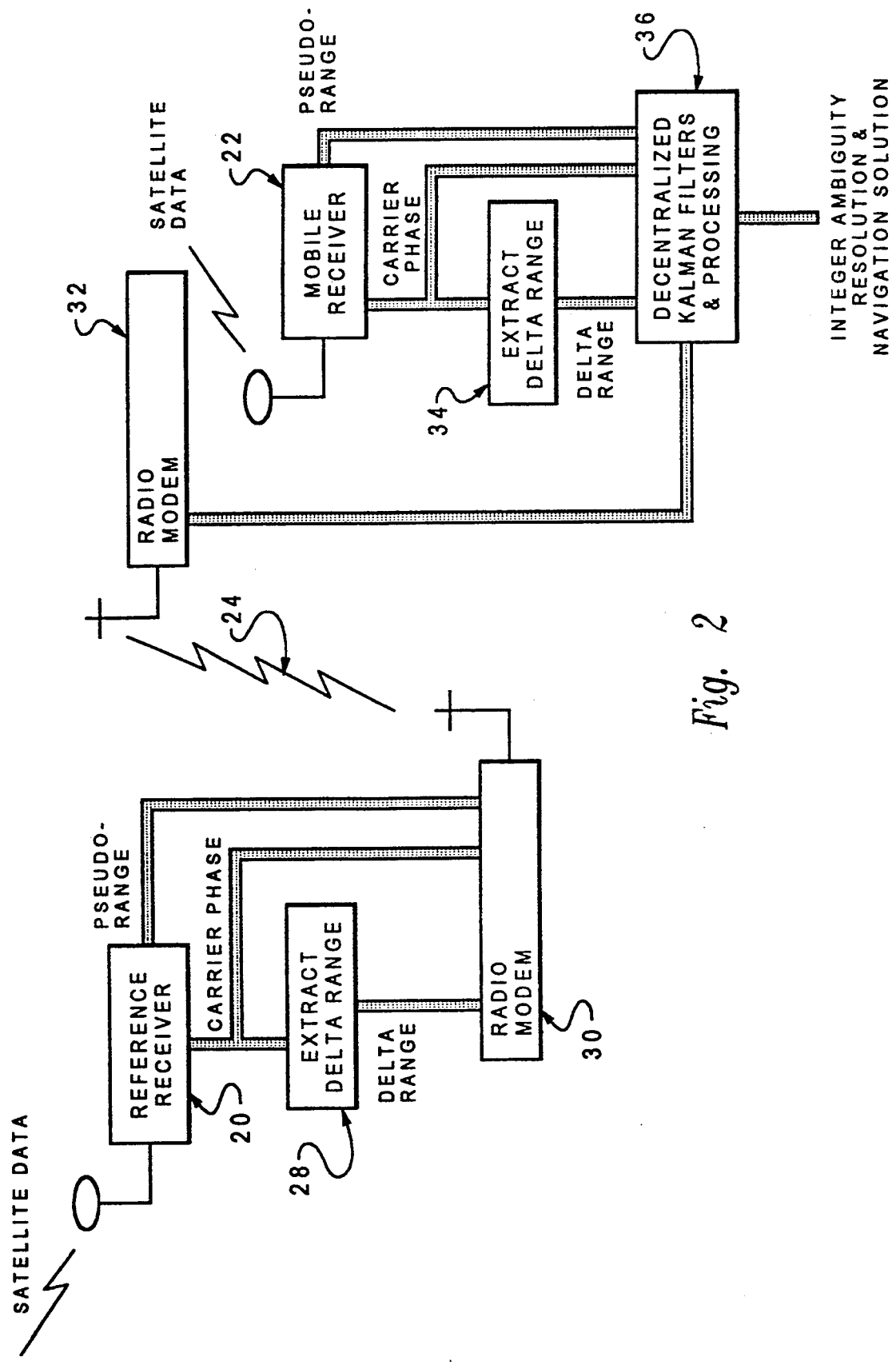
FIG. 2 is a high level block diagram of the system of the present invention which includes a reference receiver station and a mobile GPS receiver.

Referring now to FIG. 2, there is depicted a high level block diagram of the system of the present invention which includes a reference GPS receiver station and a mobile GPS receiver station as illustrated in FIG. 2, wherein satellite data from multiple satellites is received at reference GPS receiver station 20 and the phase of the carrier received at reference GPS receiver station 20 is utilized to extract a delta range value between the reference GPS receiver station and each satellite in a manner well known to those having ordinary skill in the art. This delta range value, the carrier phase data and pseudorange data are then coupled to radio modem 30 which transmits that data and the precisely known coordinates for the location of reference GPS receiver 20 to radio modem 32 which is associated with mobile GPS receiver 22.

As depicted, mobile GPS receiver station 22 also receives satellite data from multiple GPS satellites and the pseudorange, delta range and carrier phase data for mobile GPS receiver 22 are then coupled to a decentralized Kalman filter system for processing in conjunction with the data from the reference GPS receiver station to permit the integer ambiguity of the satellite signal carrier to be resolved and an accurate navigation solution to be calculated.

Figure 3A:
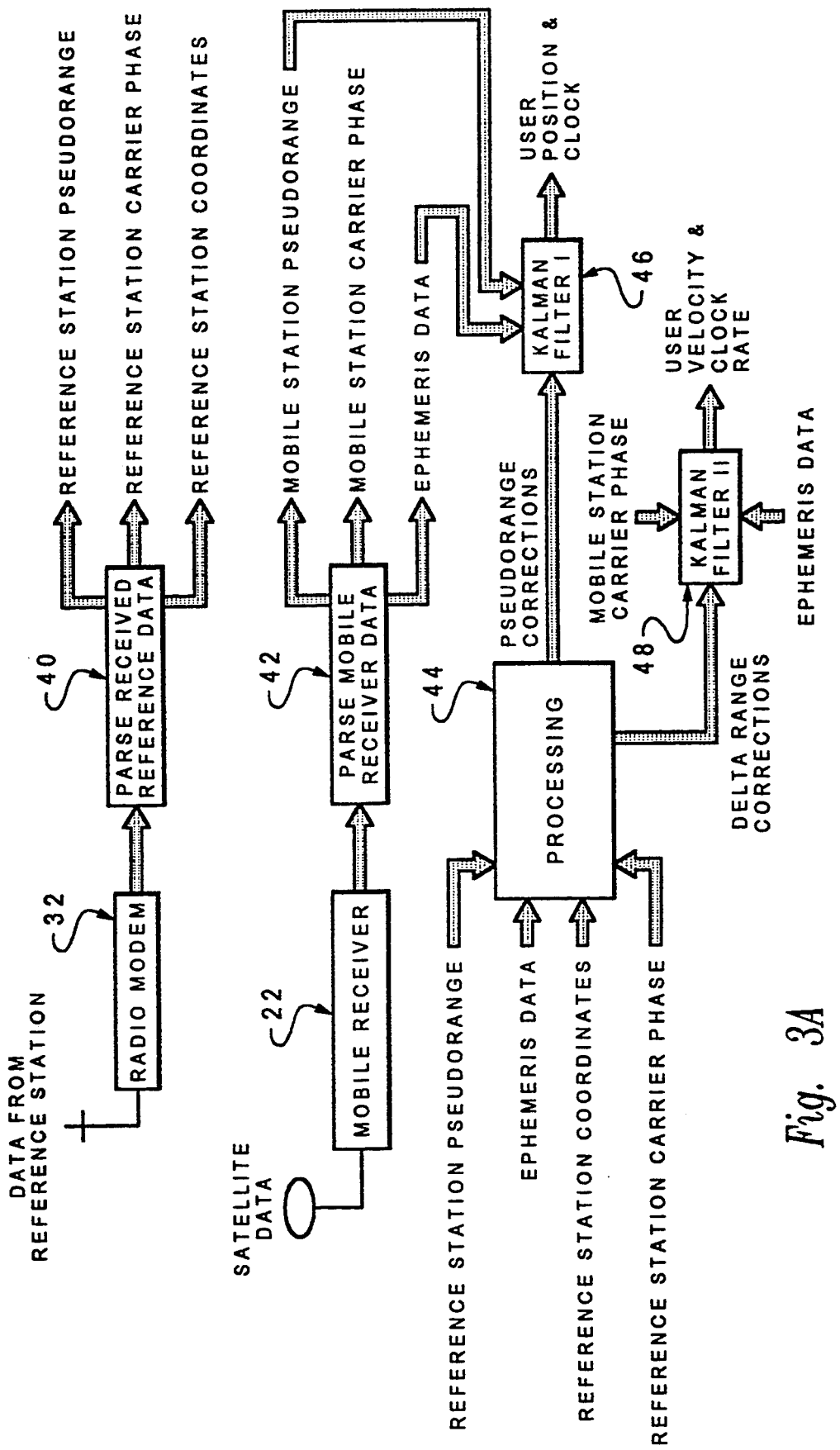
FIGS. 3A and 3B form a more detailed high level block diagram of the system of FIG. 2.
Figure 3B:
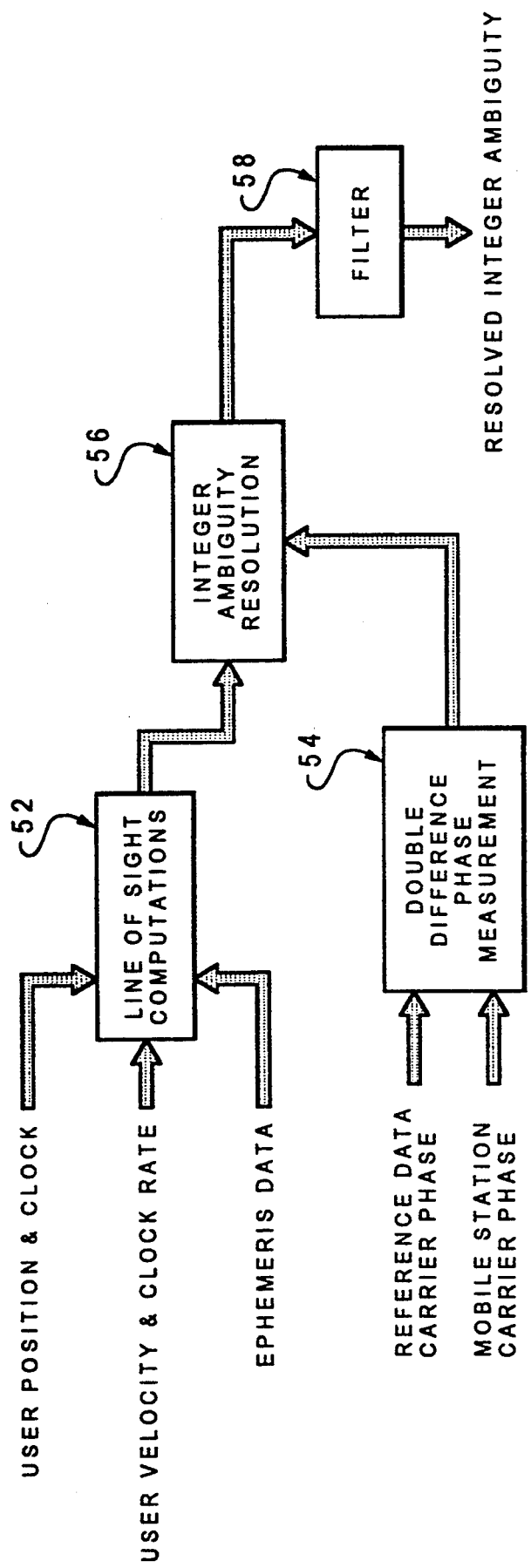

With reference now to FIGS. 3A and 3B, there is illustrated a more detailed high level block diagram of the system of FIG. 2. As depicted, data from the reference GPS receiver station is received at radio modem 32 and then parsed as illustrated at block 40. A reference station pseudorange, reference station carrier phase and the accurately determined reference station coordinates are then available. Next, satellite data is received at mobile GPS receiver station 22 and parsed to determine a mobile station pseudorange, mobile station carrier phase and the ephemeris data for the satellites which have been received.

In a manner which will be explained in greater detail herein, the reference station pseudorange data, ephemeris data, reference station coordinates and reference station carrier phase are then processed, as indicated at block 44, utilizing an appropriately programmed microprocessor to generate delta range corrections and pseudorange corrections. The pseudorange corrections are then applied to Kalman filter 1 in conjunction with the mobile GPS receiver station pseudorange data and the ephemeris data to calculate a corrected vector for user position and time. A second Kalman filter is then utilized to determine a corrected vector for user velocity and clock rate by operating upon the delta range correction, the mobile GPS receiver station carrier phase and the ephemeris data.

The outputs of each Kalman filter are then coupled to block 52 in conjunction with the ephemeris data to permit line of sight position computations to be accomplished. The output of the line of sight computation is then utilized in conjunction with a double difference phase measurement, which is determined in a manner well known to those having ordinary skill in the art, by utilizing the carrier phases from two different satellites which are collected simultaneously at the reference GPS receiver station and mobile GPS receiver station in a manner well documented in the literature. The double difference phase measurement and line of sight computations are then utilized to resolve the integer ambiguity of the carrier from the satellite, as indicated at block 56 and the output of this block is then coupled to filter 58. Block 58 comprises a low pass filter or least squares estimator which is utilized in order to determine if the resolved integer ambiguity satisfies the user specified criteria. In this manner, the search process typically associated with carrier integer ambiguity determination is eliminated.

Figure 4:
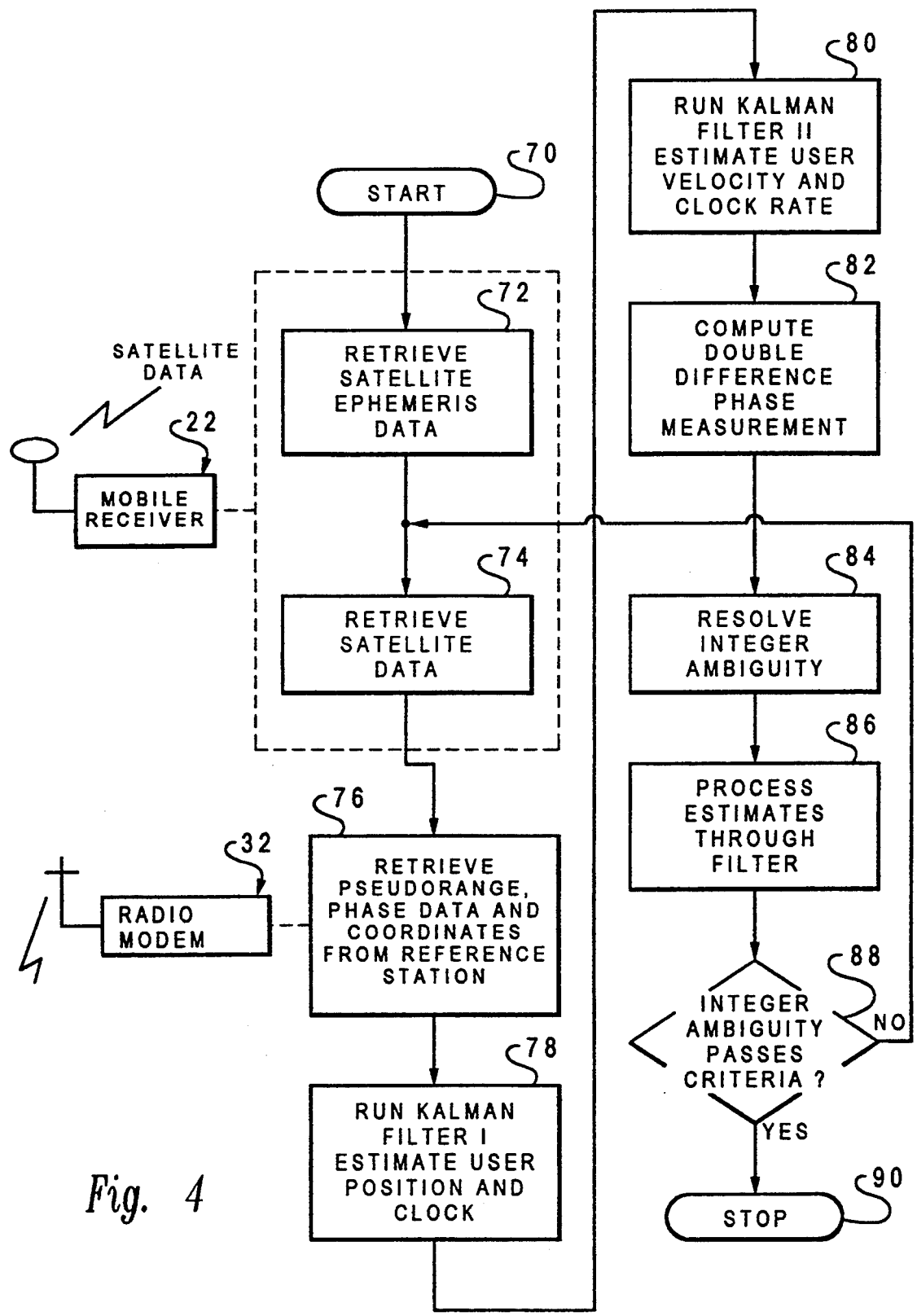
FIG. 4 is a high level logic flowchart illustrating a process for implementing the method and system of the present invention.

With reference now to FIG. 4, there is illustrated a high level flowchart which depicts a process for implementing the method and system of the present invention. As depicted, the process begins at block 70 and thereafter passes to block 72. Block 72 depicts the retrieval of the satellite ephemeris data. Those skilled in the art will appreciate that this data comprises the identification and positions of the received GPS satellites. The satellite data received at mobile GPS receiver station 22 is then retrieved, as depicted at block 74.

Next, the process passes to block 76 which illustrates the retrieval of the pseudorange, phase data and coordinates from the reference station which are received utilizing radio modem 32 in the manner described above. Thereafter, the first Kalman filter is run to estimate the user position and clock value. The first Kalman filter has four states; these states are: the three estimated erosion the earth centered earth fixed coordinate values of assumed position and the fourth is the estimated difference in time between the mobile receiver clock and GPS time. The process then passes to block 80 which illustrates the running of the second Kalman filter to estimate the user velocity and clock rate. The second Kalman filter also has four states. These states are: the three errors in assumed mobile receiver velocity deferred in earth centered earth fixed coordinates and the fourth state is the estimated error in the assumed rate of change of the mobile receiver clock. Next, block 82 illustrates the computing of a double difference phase measurement and this information is then utilized to resolve the integer ambiguity of the carrier from the satellite, as depicted at block 84.

Finally, estimates of integer ambiguity are processed through a low pass filter or least squares estimator and block 88 then depicts a determination of whether or not the integer ambiguity has been calculated passes that criteria. If not, the process returns to block 74, in an iterative fashion, to once again attempt to resolve the integer ambiguity. Alternately, in the event the integer ambiguity which has been resolved does pass the criteria, the process passes to block 90 and terminates. Those having ordinary skill in the art will appreciate that having resolved the integer ambiguity the position of mobile GPS receiver 22 may be determined with a high degree of accuracy.

Figure 5:
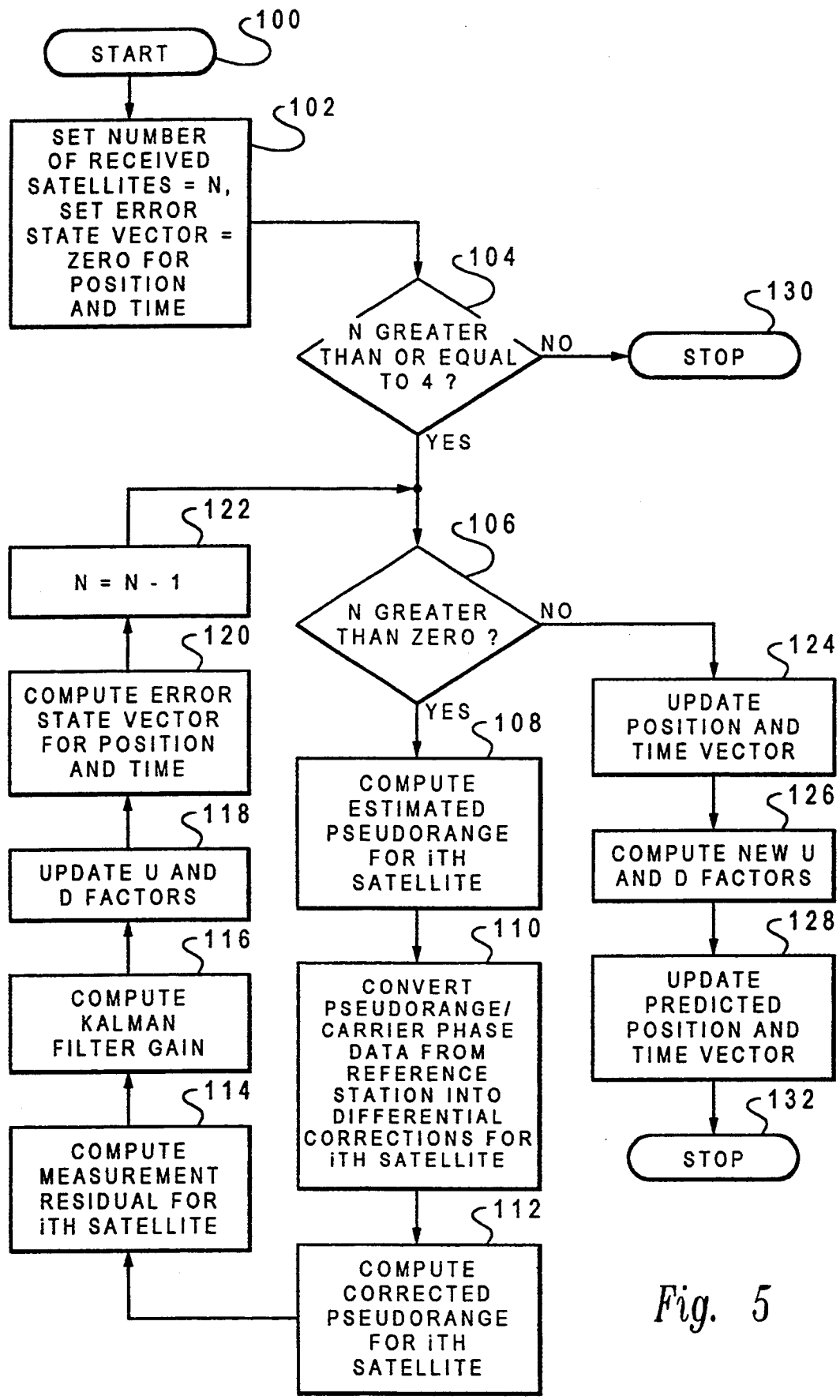
FIG. 5 is a high level logic flowchart illustrating the operation of the first Kalman filter within the mobile GPS receiver of FIG. 2.

Next, with reference to FIG. 5, there is depicted a high level logic flowchart which illustrate the operation of the first Kalman filter within the mobile GPS receiver of FIG. 2. As depicted, this process begins at block 100 and thereafter passes to block 102. Block 102 illustrates the setting of the number of received satellites to "N" and the setting of the error state vector to "zero" for position and time. Next, the process passes to block 104.

Block 104 illustrates a determination of whether or not "N" is greater than or equal to four and if not, the process passes to block 130 and terminates. Those having skill in this art will appreciate that a minimum of four GPS satellites must be received in order to accurately determine the position of a mobile GPS receiver station.

Still referring to block 104, in the event the number of received satellites is greater than or equal to four the process passes to block 106. Block 106 illustrates a test to determine whether or not the number of satellite data remaining to be processed is greater than zero and if so, the process passes to block 108. Block 108 illustrates the computing of the estimated pseudorange for the ith satellite. The process then passes to block 110 which illustrates the conversion of the pseudorange/carrier phase data from the reference station into differential corrections for this satellite.

Next, the process passes to block 112. Block 112 illustrates the computation of the corrected pseudorange for the ith satellite as illustrated in Equation 1.

EQUATION 1

$$\hat{Z}_{\zeta_i} = Z_{\zeta_i} - \delta\rho_i$$

where the corrected measurement is determined by combining the actual measurement for the ith satellite with the differential corrections for that satellite.

Next, the process passes to block 114. Block 114 illustrates the calculation of the measurement residual as set forth in Equation 2:

EQUATION 2

$$\delta_i = \hat{Z}_{\zeta_i} - \zeta_{\rho_i}$$

where the measurement residual is determined by combining the corrected pseudorange with the predicted pseudorange.

Thereafter, the process passes to block 116. Block 116 illustrate the computation of the Kalman filter gain utilizing the Bierman $UDU_T$ formulation, where the gain is determined as set forth in Equation 3:

EQUATION 3

$$\overline{K} = P_p H^T / (H P_p H^T + R)$$

Next, the U and D factors for the Kalman filter are updated, as illustrated in block 118, and the process then passes to block 120. The process of updating u and D factors is well known to those skilled in the art. A detailed technique is given in Theorem V.3.1. in the book "Factorization Methods for Discrete Sequential Estimation" by Gerald J. Bierman, published by the Academic Press (1977). Block 120 illustrate the computation of the error state vector for position and time. The error state vector may be expressed as set forth within Equation 4, wherein the error state vector is corrected utilizing the Kalman filter gain and the measurement residual.

EQUATION 4

$$\overline{EX}_p = \overline{EX}_p + \overline{K}\delta Z_i$$

At this point, the process passes to block 122 which illustrate the decrementing of the value of "N" and the process then returns to block 106 in an iterative fashion.

Still referring to block 106, in the event the current value of N is not greater than zero, the process passes to block 124. Block 124 illustrates the updating of the position and time vector as set forth in Equation 5:

EQUATION 5

$$\hat{X}^+{}_p = \hat{X}^-{}_p + \overline{EX}_p$$

wherein the updated position and time vector is determined utilizing the predicted vector of position and time and the error state vector for position and time.

The process then passes to block 126 which illustrates the computation of new U and D factors by decomposing the covariance matrix for position and time, as set forth within Equation 6:

$$P_p = uDu^T + Q_p$$

wherein the $Q_p$ comprises the process noise matrix.

The process then passes to block 128 which illustrates the updating of the predicted position and time vector, as set forth below in Equation 7:

EQUATION 7

$$\hat{X}^-{}_p = \hat{X}^+{}_p + \overline{X}^-{}_v \Delta T$$

the process then passes to block 132 and terminates.

Figure 6:
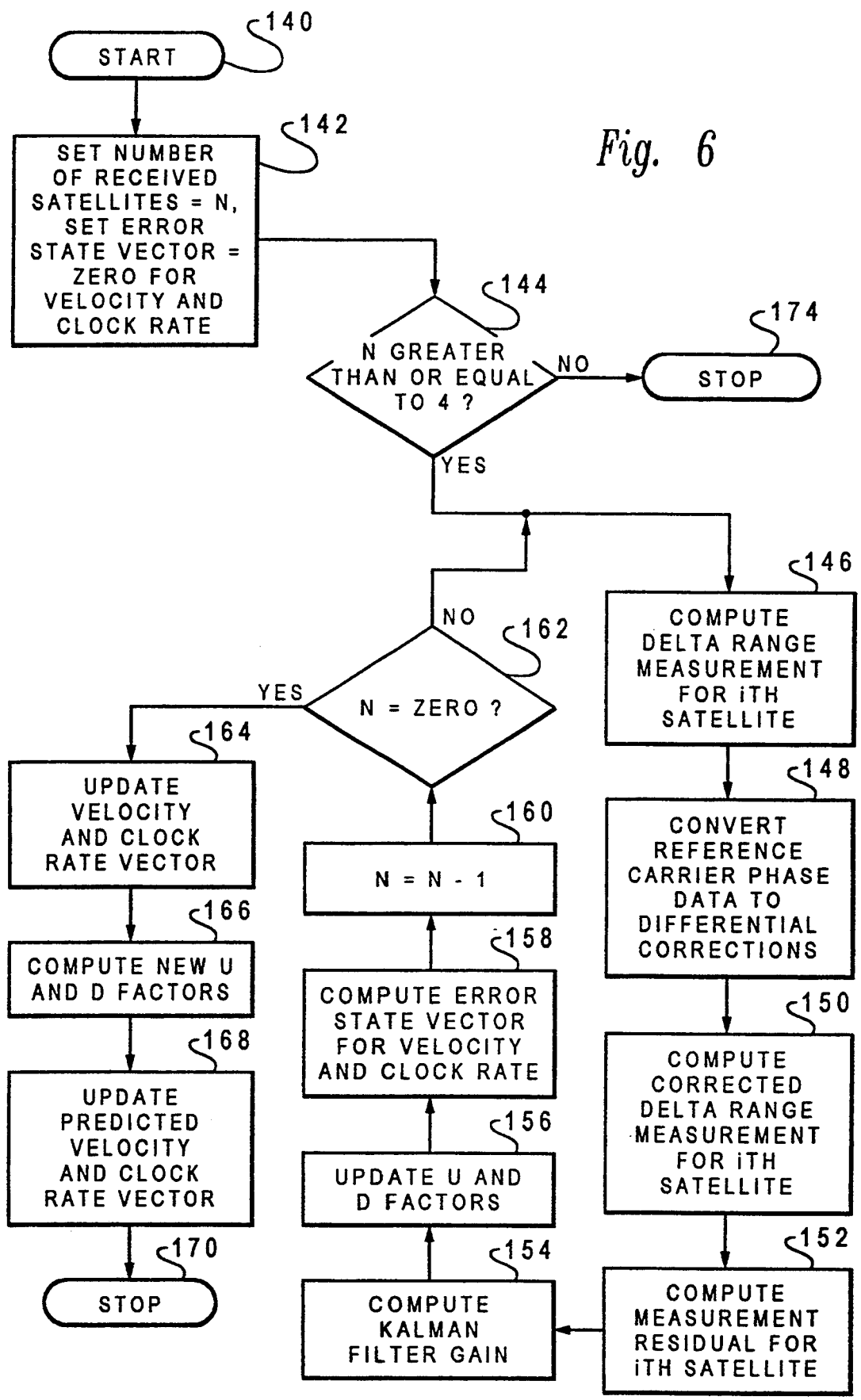
FIG. 6 is a high level logic flowchart illustrating the operation of the second Kalman filter within the mobile GPS receiver of FIG. 2.

Finally, with reference to FIG. 6 there is depicted a high level flowchart which illustrates the operation of the second Kalman filter within mobile GPS receiver station 22 of FIG. 2.

As depicted, this process begins at block 140 and thereafter passes to block 142 which depicts the setting of the number of received satellites to "N" and the setting of the error state vector equal to zero for velocity and clock rate. The process then passes to block 144 which depicts the determination of whether or not "N" is greater than or equal to "4." As set forth above, unless four or more satellites are received at the mobile GPS receiver station, the process cannot occur. Thus, in the event "N" is not greater than or equal to "4," the process passes to block 174 and terminates.

Still referring to block 144 in the event number of received satellites is greater than or equal to "4" the process passes to block 146. Block 146 illustrates the computing of the delta range measurement for the ith satellite, as set forth within Equation 8:

EQUATION 8

$$Z_{d\zeta i} = \int_{T-1}^{T} \phi_i(t) dt$$

where $\phi_i(t)$ is the measured carrier phase to the ith satellite.

Next, the process passes to block 148 which illustrates the converting of the reference carrier phase data to differential corrections and the process then passes to block 150 which depicts the computation of the corrected delta range measurement for the ith satellite, as set forth in Equation 9:

EQUATION 9

$$\hat{Z}_{\delta\zeta_i} = Z_{\delta\zeta_i} - \delta_i$$

Equation 9 illustrates the computation of the corrected delta range measurement for the ith satellite by combining the delta range measurement with the differential correction for that satellite.

The process then passes to block 152 which illustrates the computation of the measurement residual for the ith satellite, as set forth within Equation 10:

EQUATION 10

$$\delta Z_i = Z_{\delta\zeta_i} - \delta_{\delta\zeta_i}$$

As above, the process then passes to block 154 which illustrates the computation of the Kalman filter gain utilizing the Bierman formulation. The U and D factors are then updated, utilizing the computed Kalman filter gain, as depicted at block 156.

Next, the process passes to block 158 which illustrates the computation of the error state vector for velocity and clock rate, as set forth in Equation 11, utilizing the previous error state vector, the Kalman filter gain and the measurement residual:

EQUATION 11

$$\overline{EX}v = \overline{EX}v + K\delta Z_i$$

Next, the process passes to block 160 which illustrates the decrementing of the value "N" and the process then passes from block 160 to block 162. Block 162 illustrates a test to determine whether or not "N" has been decremented to equal "0" and if not, the process returns to block 146, in an iterative fashion, to reiterate the process set forth above.

Still referring to block 162, in the event "N" has been decremented until it equals "0," the process passes to block 164. Block 164 illustrates the updating of the velocity and clock rate vector as set forth in Equation 12:

EQUATION 12

$$\overline{X}^+{}_v = \overline{X}^-{}_v + \overline{EX}_v$$

Next, the process passes to block 166 which illustrates the computation of the new U and D factors by updating the covariance matrix in the manner set forth within Equation 13:

EQUATION 13

$$P_v = uDu^T + Q_v$$

The predicted velocity and clock rate vector is then updated, as depicted at block 168 and as set forth within Equation 14:

EQUATION 14

$X^-_v = X^+_v$ and the process then terminates, as depicted at block 170.

Upon reference to the foregoing those skilled in the art will appreciate that the Applicant herein has provided a technique whereby the double difference integer ambiguity for the satellite carrier wave may be rapidly and accurately determined in real time without requiring the extended search process typically utilized in the prior art. In this manner, the position of a mobile GPS receiver station may be accurately determined in a matter not heretofore possible.

While the invention has been shown in only one of its forms, it is not thus limited but is susceptible to various changes and modifications without departing from the spirit thereof.

What is claimed is:

1. A method for accurately determining the position coordinates of a mobile GPS receiver with respect to the earth's surface, said method comprising the steps of:

receiving at a reference station which is located at precisely known coordinates a plurality of GPS satellite signals which each comprise a pseudo random noise (PRN) code containing implicit clock data modulated on a carrier wave of known frequency;

calculating carrier phase data and a pseudorange with respect to each received GPS satellite from the reference station;

receiving at said mobile GPS receiver a plurality of GPS satellite signals which each comprise a pseudo random noise (PRN) code containing implicit clock data modulated on a carrier wave of known frequency;

calculating carrier phase data and a pseudorange with respect to each received GPS satellite from said mobile GPS receiver;

applying GPS satellite ephemeris parameters and the calculated pseudoranges to a first Kalman filter to obtain an error state vector for position and time;

applying GPS satellite ephemeris parameters and said calculated carrier phase data to a second Kalman filter to obtain a predicted vector of velocity and clock rate error;

estimating line of sight range and range rates to each GPS satellite from the mobile GPS receiver utilizing the outputs of the first and second Kalman filters;

calculating double difference phase measurements utilizing carrier phase data received from at least two GPS satellites;

resolving carrier wave integer ambiguity utilizing said estimated line of sight range and range rates and said double difference phase measurements in order to calculate an accurate set of coordinates for said mobile GPS receiver; and periodically updating position coordinates for said mobile GPS receiver based upon said resolved carrier wave integer ambiguity and subsequent carrier phase variations.

2. The method for accurately determining the position coordinates of a mobile GPS receiver according to claim 1, wherein said step of applying GPS satellite ephemeris parameters and the calculated pseudoranges to a first Kalman filter to obtain an error state vector for position and time comprises the step of applying GPS satellite ephemeris parameters and the calculated pseudoranges to a four state Kalman filter having states which represent errors in assumed position along three axes and an error in assumed time.

3. The method for accurately determining the position coordinates of a mobile GPS receiver according to claim 1, wherein said step of applying GPS satellite ephemeris parameters and said calculated carrier phase data to a second Kalman filter to obtain a predicted vector of velocity and clock rate error comprises the step of mathematically integrating said calculated carrier phase data for one second to generate delta range measurements and then applying said delta range measurements and said GPS satellite ephemeris parameters to said second Kalman filter to obtain a predicted vector of velocity and clock rate error.

4. The method for accurately determining the position coordinates of a mobile GPS receiver according to claim 1, wherein said step of resolving double difference carrier wave integer ambiguity utilizing said estimated line of sight ranges and range rates and said double difference phase measurements further includes the step of processing said double difference carrier wave integer ambiguity to obtain a final value thereof.

5. The method for accurately determining the position coordinates of a mobile GPS receiver according to claim 4, wherein said step of processing said double difference carrier wave integer ambiguity to obtain a final value thereof comprises the step of applying said double difference carrier wave integer ambiguity to a low pass filter.

6. The method for accurately determining the position coordinates of a mobile GPS receiver according to claim 4, wherein said step of processing said double difference carrier wave integer ambiguity to a least squares estimator.

7. A system for determining the position coordinates of a mobile GPS receiver with respect to the earth's surface, said system comprising:

a reference station located at precisely known coordinates for receiving a plurality of GPS satellite signals which each comprise a pseudo random noise (PRN) code containing implicit clock data modulated on a carrier wave of known frequency;

means within said reference station for calculating carrier phase data and a pseudorange with respect to each received GPS satellite from the referenced station;

a mobile GPS receiver for receiving a plurality of GPS satellite signals which each comprise a pseudo random noise (PRN) code containing implicit clock data modulated on a carrier wave of known frequencies;

means within said mobile GPS receiver for calculating carrier phase data at a pseudorange with respect to each received GPS satellite from said mobile GPS receiver;

a communication link for interconnecting said reference station and said mobile GPS receiver;

a first Kalman filter within said mobile GPS receiver for operating on GPS satellite ephemeris parameters and calculated pseudoranges from both said reference station and said mobile GPS receiver to each received GPS satellite to obtain an error state vector for position and time;

a second Kalman filter within said mobile GPS receiver for operating on GPS satellite ephemeris parameters and calculated carrier phase data from both said reference station and said mobile GPS receiver to obtain a predicted vector of velocity and clock rate error;

processor means within said mobile GPS receiver for estimating line of sight ranges and range rates to each GPS satellite from the mobile GPS receiver utilizing outputs of the first and second Kalman filters;

means for calculating double difference phase measurements utilizing carrier phase data received from at least two GPS satellites;

means for resolving carrier wave integer ambiguity utilizing said estimated line of sight ranges and range rates and said double difference phase measurements in order to calculate an accurate set of coordinates for said mobile GPS receiver; and means for periodically updating position coordinates for said mobile GPS receiver based upon said resolved double difference carrier wave integer ambiguity and subsequent carrier phase variations.

8. A system for determining the position coordinates of a mobile GPS receiver according to claim 7, wherein said first Kalman filter comprises a four state Kalman filter having states which represent errors in associated position along three axes and an error in assumed time.

* * * * *